United States Patent
Wu et al.

(10) Patent No.: US 6,684,118 B2
(45) Date of Patent: Jan. 27, 2004

(54) FABRICATION FACILITY CYCLE TIME APPROXIMATION METHOD EMPLOYING HISTORIC WORK IN PROCESS (WIP) CYCLE TIME CORRELATION

(75) Inventors: Kan Wu, Hsinchu (TW); Wei-Jai Hung, Hsin-chu (TW); Shu-Chuan Tu, Taoyuan (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 176 days.

(21) Appl. No.: 10/047,328

(22) Filed: Jan. 14, 2002

(65) Prior Publication Data

US 2003/0135287 A1 Jul. 17, 2003

(51) Int. Cl.$^7$ .................... G06F 19/00; G06F 17/60
(52) U.S. Cl. .................. 700/99; 700/103; 700/108; 700/121; 705/7
(58) Field of Search ................... 700/97, 99, 103, 700/108, 121; 705/7

(56) References Cited

U.S. PATENT DOCUMENTS

| | | | | |
|---|---|---|---|---|
| 4,615,723 A | * | 10/1986 | Rodriguez-Fernandez et al. | 65/163 |
| 5,305,221 A | * | 4/1994 | Atherton | 700/96 |
| 5,825,650 A | | 10/1998 | Wang | |
| 5,880,960 A | | 3/1999 | Lin et al. | |
| 5,893,069 A | * | 4/1999 | White, Jr. | 705/1 |
| 5,966,694 A | | 10/1999 | Rothschild et al. | |
| 6,099,598 A | * | 8/2000 | Yokoyama et al. | 29/25.01 |
| 6,572,796 B1 | * | 6/2003 | Gao et al. | 264/40.1 |
| 6,611,726 B1 | * | 8/2003 | Crosswhite | 700/99 |
| 2003/0055524 A1 | * | 3/2003 | Firth et al. | 700/109 |

* cited by examiner

*Primary Examiner*—Leo Picard
*Assistant Examiner*—Elliot Frank
(74) *Attorney, Agent, or Firm*—Tung & Associates

(57) ABSTRACT

Within a method for approximating a cycle time for fabricating a microelectronic fabrication within a microelectronic fabrication facility there is first determined from historic data for fabrication of the microelectronic fabrication within the microelectronic fabrication facility a constant which correlates previous microelectronic fabrication loadings and cycle times within the microelectronic fabrication facility. The correlating constant may then be employed for approximating a cycle time for a future work in process (WIP) quantity of the microelectronic fabrication within the microelectronic fabrication facility.

14 Claims, 2 Drawing Sheets

Figure 2

| Date | 4/1 | 4/2 | 4/3 | 4/4 | 4/5 | 4/6 | 4/7 | 4/8 | 4/9 | 4/10 | 4/11 | 4/12 | 4/13 | 4/14 | 4/15 | 4/16 | 4/17 | 4/18 | 4/19 | 4/20 | 4/21 | 4/22 | 4/23 | 4/24 | 4/25 | 4/26 | 4/27 | 4/28 | 4/29 | 4/30 |
|---|---|---|---|---|---|---|---|---|---|---|---|---|---|---|---|---|---|---|---|---|---|---|---|---|---|---|---|---|---|---|
| Actual CT/L | 2.28 | 2.40 | 2.40 | 2.19 | 2.56 | 2.72 | 2.34 | 2.34 | 2.34 | 2.35 | 2.35 | 2.59 | 2.62 | 2.71 | 2.52 | 2.59 | 2.46 | 2.57 | 2.62 | 2.42 | 2.64 | 2.53 | 2.49 | 2.60 | 2.63 | 2.57 | 2.32 | 2.35 | 2.29 | 2.28 |
| Forecast CT/L | 2.28 | 2.26 | 2.28 | 2.29 | 2.29 | 2.35 | 2.37 | 2.32 | 2.32 | 2.32 | 2.37 | 2.42 | 2.50 | 2.50 | 2.48 | 2.46 | 2.46 | 2.44 | 2.46 | 2.46 | 2.48 | 2.49 | 2.48 | 2.51 | 2.51 | 2.50 | 2.47 | 2.46 | 2.46 | 2.42 |
| Difference % | -0.19% | -5.67% | -5.10% | -4.35% | -10.35% | -13.72% | -1.09% | -0.95% | -0.95% | -1.12% | -0.87% | -6.49% | -4.76% | -7.89% | -1.49% | -4.85% | -0.07% | -4.98% | -6.06% | -1.56% | -6.21% | -1.46% | -0.30% | -3.59% | -4.49% | -2.69% | -6.32% | -4.53% | -7.46% | -6.28% |

Figure 3

| Date | 8/1 | 8/2 | 8/3 | 8/4 | 8/5 | 8/6 | 8/7 | 8/8 | 8/9 | 8/10 | 8/11 | 8/12 | 8/13 | 8/14 | 8/15 | 8/16 | 8/17 | 8/18 | 8/19 | 8/20 | 8/21 | 8/22 | 8/23 | 8/24 | 8/25 | 8/26 | 8/27 | 8/28 | 8/29 | 8/30 | 8/31 |
|---|---|---|---|---|---|---|---|---|---|---|---|---|---|---|---|---|---|---|---|---|---|---|---|---|---|---|---|---|---|---|---|
| Actual CT/L | 2.12 | 2.52 | 2.34 | 2.27 | 2.10 | 2.05 | 2.16 | 2.42 | 2.28 | 2.26 | 2.23 | 2.29 | 2.04 | 2.24 | 2.31 | 2.25 | 2.25 | 2.25 | 2.08 | 2.13 | 2.02 | 2.36 | 2.12 | 2.21 | 2.24 | 2.08 | 2.11 | 2.22 | 2.27 | 2.15 | 2.12 |
| Forecast CT/L | 2.26 | 2.27 | 2.26 | 2.28 | 2.28 | 2.27 | 2.28 | 2.27 | 2.26 | 2.27 | 2.29 | 2.31 | 2.31 | 2.28 | 2.27 | 2.27 | 2.26 | 2.27 | 2.26 | 2.25 | 2.25 | 2.25 | 2.25 | 2.25 | 2.25 | 2.23 | 2.24 | 2.23 | 2.22 | 2.22 | 2.19 |
| Difference % | 6.51% | -10.03% | -3.36% | 0.33% | 8.61% | 10.84% | 5.45% | -6.21% | -0.70% | 0.37% | 2.74% | 0.83% | 13.42% | 1.96% | -1.68% | 0.70% | 0.41% | 0.68% | 8.80% | 5.62% | 11.39% | -4.56% | 6.15% | 2.03% | 0.41% | 6.98% | 6.19% | 0.40% | -2.04% | 3.31% | 3.41% |

FABRICATION FACILITY CYCLE TIME APPROXIMATION METHOD EMPLOYING HISTORIC WORK IN PROCESS (WIP) CYCLE TIME CORRELATION

BACKGROUND OF THE INVENTION

1. Field of the Invention

The present invention relates generally to methods for approximating cycle times within fabrication facilities. More particularly, the present invention relates to methods for accurately and efficiently approximating cycle times within fabrication facilities.

2. Description of the Related Art

Microelectronic fabrications are formed from microelectronic substrates over which are formed patterned microelectronic conductor layers which are separated by microelectronic dielectric layers.

As is understood by a person skilled in the art, microelectronic fabrications, and in particular semiconductor integrated circuit microelectronic fabrications, are typically fabricated within microelectronic fabrication facilities while employing intricate multi-step microelectronic fabrication processes which employ a multiplicity of microelectronic fabrication tools within a generally distributed and repetitive microelectronic fabrication process to provide microelectronic fabrications which are generally fabricated with patterned microelectronic conductor layers which are horizontally and vertically separated by microelectronic dielectric layers.

Significant to the fabrication of microelectronic fabrications within microelectronic fabrication facilities is the approximation of cycle times for individual work in process (WIP) workload lots released for fabrication within microelectronic fabrication facilities. Approximation of cycle times for individual work in process (WIP) workload lots is of considerable importance when fabricating microelectronic fabrications within microelectronic fabrication facilities insofar as accurate cycle time approximations provide for enhanced microelectronic fabrication order confirmation accuracy and enhanced microelectronic fabrication facility operational control when fabricating microelectronic fabrications within microelectronic fabrication facilities.

It is thus desirable in the art of microelectronic fabrication to provide methods for accurately and efficiently approximating cycle time when fabricating microelectronic fabrications within microelectronic fabrication facilities.

It is towards the foregoing object that the present invention is directed.

Various methods have been disclosed within various fabrication arts for monitoring and controlling fabrication facilities when fabricating products therein.

Included among the methods, but not limited among the methods, are methods disclosed within: (1) Wang, in U.S. Pat. No. 5,825,650 (a method for dynamically approximating a standard cycle time for an individual process stage when fabricating a semiconductor integrated circuit microelectronic fabrication lot within a semiconductor integrated circuit microelectronic fabrication facility, by use of a regressive analysis directed towards past cycle time measurements in conjunction with fabrication facility equipment utilization rates for prior semiconductor integrated circuit microelectronic fabrication lots fabricated within the semiconductor integrated circuit microelectronic fabrication facility); (2) Lin et al., in U.S. Pat. No. 5,880,960 (a method for enhancing work in process (WIP) workload queue balance within a fabrication facility, such as a semiconductor integrated circuit microelectronic fabrication facility, by defining in a first instance a daily standard move quantity of product which is desired to be produced from the fabrication facility); and (3) Rothschild et al., in U.S. Pat. No. 5,966,694 (a method for overall cycle time costing within a fabrication facility, by determining, analyzing and coalescing fabrication facility data for individual fabrication cells within the fabrication facility).

Desirable in the art of microelectronic fabrication are additional methods which may be employed in the art of microelectronic fabrication for approximating, with enhanced accuracy and efficiency, cycle times for fabricating microelectronic fabrication work in process (WIP) workload lots within microelectronic fabrication facilities.

It is towards the foregoing object that the present invention is directed.

SUMMARY OF THE INVENTION

A first object of the present invention is to provide a method for approximating a cycle time for fabricating a microelectronic fabrication work in process (WIP) lot within a microelectronic fabrication facility.

A second object of the present invention is to provide a method in accord with the first object of the present invention, wherein the cycle time is accurately and efficiently approximated.

A third object of the present invention is to provide a method in accord with the first object of the present invention and the second object of the present invention, wherein the method is readily commercially implemented.

In accord with the objects of the present invention, there is provided by the present invention a method for approximating a cycle time for fabricating a microelectronic fabrication within a microelectronic fabrication facility.

To practice the method of the present invention, there is first provided a microelectronic fabrication facility for fabricating a microelectronic fabrication product having a minimum of one layer. There is then determined from historic data for fabricating the microelectronic fabrication product within the microelectronic fabrication facility a positive value of h such as to minimize the summation:

$$\Sigma_{i(m->n)}(W_i-(h*T_i))^2$$

where: (1) $W_i$ is the work in process (WIP) quantity of the microelectronic fabrication product on day i; (2) $T_i$ is the cycle time per photo layer of the microelectronic fabrication product on day i; and (3) m and n bound an arbitrarily chosen historic date range. There is then approximated a future work in process (WIP) quantity of the microelectronic fabrication product for a future start date within the microelectronic fabrication facility. Finally, there is then approximated a cycle time for the future work in process (WIP) quantity of the microelectronic fabrication product within the microelectronic fabrication facility using the equation:

$$CT_f = W_f*(1/h)*L$$

where: (1) $CT_f$ is the cycle time approximated for the future work in process (WIP) quantity of the microelectronic fabrication product; (2) $W_f$ is the approximated future work in process (WIP) quantity of the microelectronic fabrication product; and (3) L is the number of photo layers of the microelectronic fabrication product.

The present invention provides a method for accurately and efficiently determining a cycle time for fabricating a microelectronic fabrication within a microelectronic fabrication facility.

The method of the present invention realizes the foregoing object by employing a mathematical algorithm for approximating the cycle time for fabricating the microelectronic fabrication within the microelectronic fabrication facility, wherein the mathematical algorithm operates upon: (1) an historic work in process (WIP) workload loading of the microelectronic fabrication product within the microelectronic fabrication facility; in conjunction with (2) an historic cycle time for the historic work in process (WIP) workload loading of the microelectronic fabrication product within the microelectronic fabrication facility.

The method of the present invention is readily commercially implemented.

The present invention employs data accumulation methods and data reduction methods as are otherwise readily adaptable to the art of microelectronic fabrication, but employed within the context of a specific mathematical algorithm to provide a method in accord with the present invention.

Since it is thus a specific mathematical algorithm which provides at least in part the present invention, rather than the existence of methods and materials which provides the present invention, the method of the present invention is readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 2 and FIG. 3 each show a Table of Actual Cycle Time per photo layer (CT/L) and Forecast Cycle Time per photo layer (CT/L), as observed and calculated in accord with a pair of examples of the present invention.

DESCRIPTION OF THE PREFERRED EMBODIMENT

Figure 1:
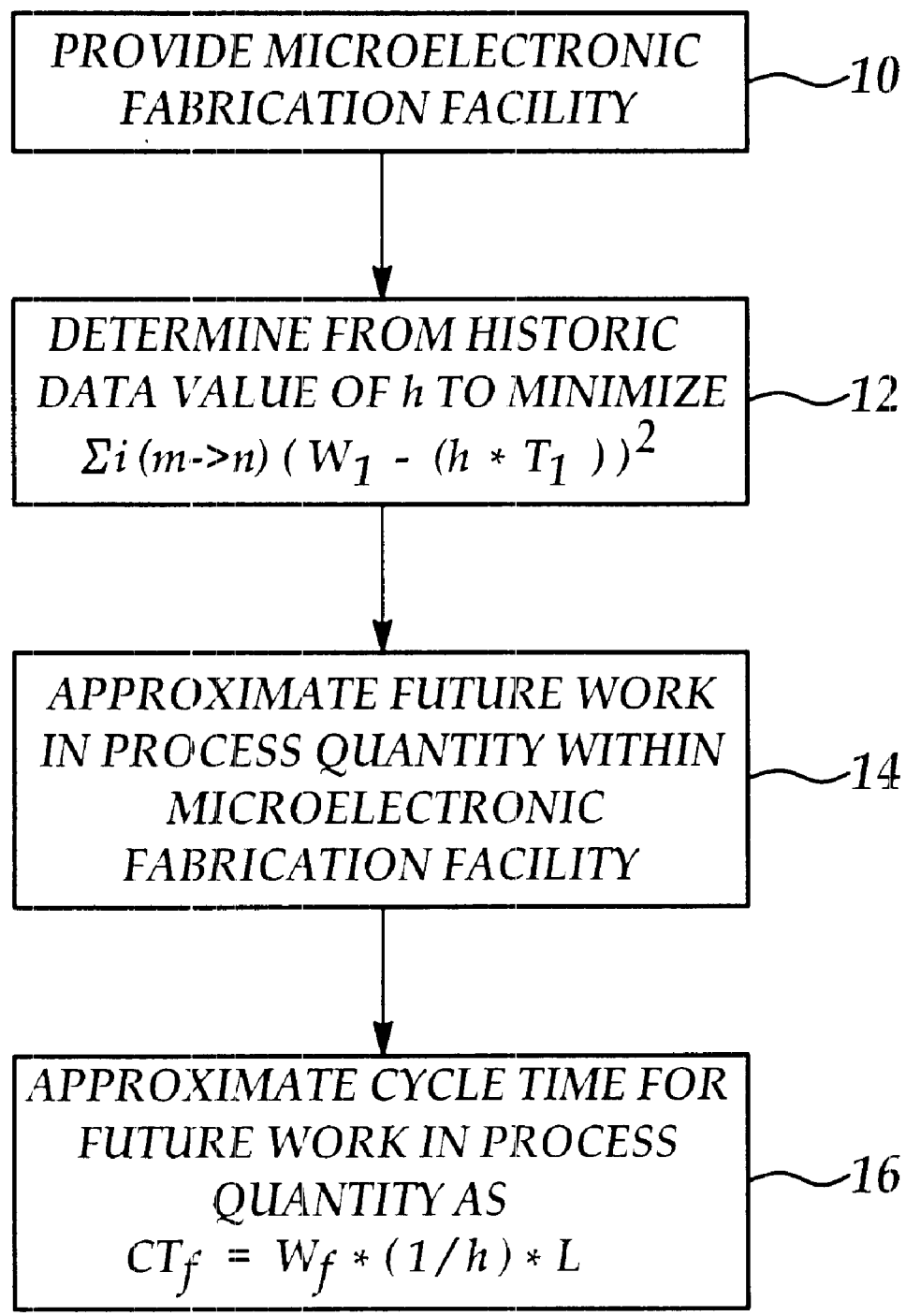
FIG. 1 shows a schematic process flow diagram illustrating a series of process steps in accord with the method of the present invention.

The present invention provides a method for accurately and efficiently determining a cycle time for fabricating a microelectronic fabrication within a microelectronic fabrication facility.

The method of the present invention realizes the foregoing object by employing a mathematical algorithm for approximating the cycle time for fabricating the microelectronic fabrication within the microelectronic fabrication facility, wherein the mathematical algorithm operates upon: (1) an historic work in process (WIP) workload loading of the microelectronic fabrication product within the microelectronic fabrication facility; in conjunction with (2) an historic cycle time for the historic work in process (WIP) workload loading of the microelectronic fabrication product within the microelectronic fabrication facility.

While the present invention provides particular value within the context of approximating cycle times for microelectronic fabrication products fabricated within microelectronic fabrication facilities, the present invention is not so limited. Rather, the present invention may be employed for approximating cycle times for fabricating products including but not limited to electronic products, microelectronic products, and mechanical products within fabrication facilities including but not limited to electronic fabrication facilities, microelectronic fabrication facilities and mechanical fabrication facilities. Typically and preferably, a product fabricated within a fabrication facility in accord with the present invention is fabricated employing at least one, and preferably several, process sequences, which further are repetitive process sequences.

Similarly, more particularly within the context of microelectronic fabrication facilities, and while the method of the present invention provides particular value within the context of approximating a cycle time within a semiconductor integrated circuit microelectronic fabrication facility, the present invention may nonetheless be employed for approximating cycle times within microelectronic fabrication facilities selected from the group including but not limited to integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

Referring now to FIG. 1, there is show a schematic process flow diagram illustrating a series of process steps in accord with a preferred embodiment of the present invention.

Shown in FIG. 1, and in accord with the block of text which corresponds with reference numeral 10, there is first provided a microelectronic fabrication facility.

Within the preferred embodiment of the present invention with respect to the microelectronic fabrication facility, and in accord with the above, the microelectronic fabrication facility may be selected from the group including but not limited to integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

Similarly, and as is understood by a person skilled in the art with respect to the preferred embodiment of the present invention, there is fabricated within the microelectronic fabrication facility a microelectronic fabrication product, generally having a minimum of one layer. Within the context of a semiconductor integrated circuit microelectronic fabrication facility and a semiconductor integrated circuit microelectronic fabrication product, as well as within the context of various other types of microelectronic fabrication facilities and corresponding types of microelectronic fabrication products, the layer may be defined within the context of a metal interconnection layer or a dielectric isolation layer. Similarly, typically and preferably, and again more typically and preferably within the context of a semiconductor integrated circuit microelectronic fabrication there is typically and preferably from about 10 to about 30 photo layers or from about 1 to about 8 dielectric isolation layers within a semiconductor integrated circuit microelectronic fabrication which is fabricated within a semiconductor integrated circuit microelectronic fabrication facility for which a cycle time may be approximated in accord with the preferred embodiment of the present invention.

Referring again to FIG. 1 and in accord with the block of text which corresponds with reference numeral 12, there is shown the next process step in accord with the preferred embodiment of the present invention.

As is illustrated within FIG. 1, and in accord with the block of text which corresponds with reference numeral 12, there is determined from historic data for fabricating the microelectronic fabrication product within the microelectronic fabrication facility a positive value of h such as to minimize the following summation:

$$\Sigma_{i(m \to n)}(W_i - (h^*T_i))^2$$

Within the preferred embodiment of the present invention with respect to the foregoing summation: (1) $W_i$ is a work in process (WIP) quantity of the microelectronic fabrication product on day i; (2) $T_i$ is the cycle time per layer of the microelectronic fabrication product on day i; and (3) m and n bound an arbitrarily chosen historic date range.

Typically and preferably, within the preferred embodiment of the present invention with respect to a semiconductor integrated circuit microelectronic fabrication facility wherein capacity is about 40,000 wafer/month: (1) the present invention method can be applied when the utilization of the semiconductor integrated circuit microelectronic fabrication facility is greater than 60% and the utilization is preferred not to change more than 10% in the range of 30 days; and (2) and m and n will typically and preferably bound a range of from about 15 to about 60 days of production within the semiconductor integrated circuit microelectronic fabrication facility immediately preceding a date for which a cycle time approximation is desired to be made.

Referring again to FIG. 1, and in accord with the block of text which corresponds with reference numeral 14, there is shown the next process step in accord with the preferred embodiment of the present invention.

As is illustrated within FIG. 1, and in accord with the block of text which corresponds with reference numeral 14, there is approximated a future work in process (WIP) workload quantity within the microelectronic fabrication facility. The future work in process (WIP) workload quantity within the microelectronic fabrication facility will typically and preferably be approximated within the historic range, as disclosed above, although such is not a limitation within the present invention.

Referring again to FIG. 1, and in accord with the block of text which corresponds with reference numeral 16, there is shown the last process step in accord with the preferred embodiment of the present invention.

As is shown in FIG. 1, and in accord with the block of text which corresponds with reference numeral 16, there is approximated a cycle time for the future work in process (WIP) workload quantity of the microelectronic fabrication product within the microelectronic fabrication facility while using the equation:

$$CT_f = W_f^*(1/h)^*L$$

Within the foregoing equation: (1) $CT_f$ is the approximated cycle time for the future work in process (WIP) workload quantity of the microelectronic fabrication product; (2) $W_f$ is the approximated future work in process (WIP) workload quantity of the microelectronic fabrication product; and (3) L is the number of photo layers of the microelectronic fabrication product.

Upon executing the process steps in accord with the schematic process flow diagram of FIG. 1, there is provided in accord with the present invention a method for efficiently approximating a cycle time within a microelectronic fabrication facility.

The method of the present invention realizes the foregoing object in a first instance by selecting a correlation coefficient such as to minimize a summation which correlates: (1) historic values of work in process (WIP) workload loading of a fabrication facility; and (2) cycle time within the fabrication facility. Similarly, the correlation coefficient may then be employed in conjunction with an approximated future work in process (WIP) workload loading within the fabrication facility to accurately and efficiently provide an approximated cycle time.

As is understood by a person skilled in the art, microelectronic fabrication total cycle times (and in particular semiconductor integrated circuit microelectronic fabrication total cycle times) are typically sufficiently lengthy such that various extraneous factors which may influence cycle time within a microelectronic fabrication facility generally have limited influence within the context of total cycle time. Thus, the method of the present invention is intended as a broadly, but accurately and efficiently, approximating method which requires no additional approximation of additional operational parameters within a microelectronic fabrication facility. Such additional operational parameters may include, for example and without limitation, tool utilization parameters or tool maintenance parameters.

EXAMPLES

In order to illustrate the value of the present invention with respect to accurately and efficiently approximating a cycle time within a semiconductor integrated circuit microelectronic fabrication facility, for an arbitrary time interval from Mar. 1, 2000 to Mar. 31, 2000 there was: (1) recorded work in process (WIP) workload quantities of from about 57352 to about 58231 semiconductor substrate wafers per day; and (2) measured cycle times per photo layer for the semiconductor substrate wafers of from 2.24 to about 2.29 days, when fabricating the semiconductor substrate wafers into semiconductor integrated circuit microelectronic fabrications within the semiconductor integrated circuit microelectronic fabrication facility.

Applying the individual data points to the summation as indicated in accord with the Description of the Preferred Embodiment, as above, there was calculated a minimum summation of 167,512,678 and an h value of 25,336.9.

The foregoing h value was employed for approximating cycle times per layer for a series of semiconductor substrate wafers fabricated within the fabrication facility for the time interval of Apr. 1, 2000 to Apr. 30, 2000. Individual work in process (WIP) workload quantities for individual days ranged from 58282 to about 61149 per day.

Shown within the Table of FIG. 2 is an Actual Cycle Time per Layer (CT/L), a Forecast Cycle Time per Layer (CT/L) and a percentage difference therebetween, for each of the days from Apr. 1, 2000 to Apr. 30, 2000.

As is illustrated within the Table of FIG. 2, differences between the Forecast Cycle Times per Layer (CT/L) and the Actual Cycle Times per Layer ranged from −13.72 percent to +7.46 percent, with an overall average difference of −2.03 percent. Thus for a 12 layer semiconductor integrated circuit microelectronic fabrication there is forecast a cycle time of 28.92 days but actually observed a cycle time of 29.57 days.

As a correlating additional example which also illustrates the value of the present invention, and for an additional arbitrary time interval period of Jul. 1, 2000 to Jul. 31, 2000, there was: (1) recorded work in process (WIP) workload lot quantities of from about 58056 to about 59966 semiconductor substrate wafers per day; and (2) measured cycle times per photo layer for the semiconductor substrate wafers of from 2.29 to about 2.33 days when fabricating the semiconductor substrate wafers into semiconductor integrated circuit microelectronic fabrications within the semiconductor integrated circuit microelectronic fabrication facility.

Again applying the individual data points to the summation as indicated in accord with the above Description of the Preferred Embodiment there is provided a minimum summation of 228,295,600 and an h value of 25,273.1.

The foregoing value of h was employed for approximating cycle time per layer for a series of semiconductor substrate wafers fabricated within the fabrication facility during the month of August 2000. Within the time frame of Aug. 1, 2000 to Aug. 31, 2000 individual work in process (WIP) workload quantities ranged from 57117 to about 58076 per day.

Shown within the Table of FIG. 3 is an Actual Cycle Time per Layer (CT/L), a Forecast Cycle Time per Layer (CT/L) and a percentage difference therebetween, for each of the days from Aug. 1, 2000 to Aug. 31, 2000.

As is illustrated within the Table of FIG. 3, differences between Forecast Cycle Times per Layer (CT/L) and Actual Cycle Times per Layer (CT/L) ranged from −10.03 percent to +13.42 percent, with an overall average difference of 2.55 percent. Thus for a 12 layer semiconductor integrated circuit microelectronic fabrication there is approximated a cycle time of 27.19 days but actually observed a cycle time of 26.49 days.

As is understood by a person skilled in the art, the preferred embodiment and examples of the present invention are illustrative of the present invention rather than limiting of the present invention. Revisions and modifications may be made to the preferred embodiment and examples of the present invention while still providing embodiments and examples of the present invention, further in accord with the accompanying claims.

What is claimed is:

1. A method for approximating a cycle time within a fabrication facility comprising:
    providing a fabrication facility for fabricating a product having a minimum of one process sequence;
    determining from historic data for fabricating the product within the fabrication facility a positive value of h such as to minimize:

$$\Sigma_{i(m->n)}(W_i-(h*T_i))^2$$

where:
    $W_i$ is the work in process quantity of the product on day;
    $T_i$ is the cycle time per process sequence of the product on day i;
    m and n bound an arbitrarily chosen historic date range;
    approximating a future work in process quantity of the product for a future start date within the fabrication facility; and
    approximating a cycle time for the future work in process quantity of the product within the fabrication facility using the equation:

$$CT_f=W_f*(1/h)*L$$

where:
    $CT_f$ is the cycle time approximated for the future work in process quantity of the product;
    $W_f$ is the approximated future work in process quantity of the product; and
    L is the number of process sequences in the product.

2. The method of claim 1 wherein the fabrication facility is selected from the group consisting of electronic fabrication facilities, microelectronic fabrication facilities and mechanical fabrication facilities.

3. The method of claim 1 wherein m and n bound a range of from about 15 to about 60 days.

4. The method of claim 1 wherein m and n bound a range of days immediately preceding a future date for which the cycle time is approximated.

5. The method of claim 1 wherein there is not independently approximated a tool utilization when approximating the cycle time.

6. A method for approximating a cycle time within a microelectronic fabrication facility comprising:
    providing a microelectronic fabrication facility for fabricating a microelectronic fabrication product having a minimum of one layer;
    determining from historic data for fabricating the microelectronic fabrication product within the microelectronic fabrication facility a positive value of h such as to minimize $$\Sigma_{i(n->m)}(W_i-(h*T_i))^2$$

where:
    $W_i$ is the work in process quantity of the microelectronic fabrication product on day i;
    $T_i$ is the cycle time per layer of the microelectronic fabrication product on day i;
    m and n bound an arbitrarily chosen historic date range;
    approximating a future work in process quantity of the microelectronic fabrication product for a future start date within the microelectronic fabrication facility; and
    approximating a cycle time for the future work in process quantity of the microelectronic fabrication product within the microelectronic fabrication facility using the equation $$CT_f=W_f*(1/h)*L$$

where:
    $CT_f$ is the cycle time approximated for the future work in process of the microelectronic fabrication product;
    $W_f$ is the approximated future work in process quantity of the microelectronic fabrication product; and
    L is the number of levels in the microelectronic fabrication product.

7. The method of claim 6 wherein the microelectronic fabrication facility is selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

8. The method of claim 6 wherein m and n bound a range of from about 15 to about 60 days.

9. The method of claim 6 wherein m and n bound a range of days immediately preceding a future date for which the cycle time is approximated.

10. The method of claim 6 wherein there is not independently approximated a tool utilization when approximating the cycle time.

11. A method for approximating a cycle time within a semiconductor integrated circuit microelectronic fabrication facility comprising:
    providing a semiconductor integrated circuit microelectronic fabrication facility for fabricating a semiconductor integrated circuit microelectronic fabrication product having a minimum of one layer;- determining from historic data for fabricating the semiconductor integrated circuit microelectronic fabrication product within the semiconductor integrated circuit microelectronic fabrication facility a positive value of h such as to minimize $$\Sigma_{i(n->m)}(W_i-(h*T_i))^2$$

where:
- $W_i$ is the work in process quantity of the semiconductor integrated circuit microelectronic fabrication product on day i;
- $T_i$ is the cycle time per layer of the semiconductor integrated circuit microelectronic fabrication product on day i;
- m and n bound an arbitrarily chosen historic date range;

approximating a future work in process quantity of the semiconductor integrated circuit microelectronic fabrication product for a future start date within the semiconductor integrated circuit microelectronic fabrication facility; and approximating a cycle time for the future work in process quantity of the semiconductor integrated circuit microelectronic fabrication product within the semiconductor integrated circuit microelectronic fabrication facility using the equation $$CT_f = W_f * (1/h) * L$$

where:
- $CT_f$ is the cycle time approximated for the future work in process of the semiconductor integrated circuit microelectronic fabrication product;
- $W_f$ is the approximated future work in process quantity of the semiconductor integrated circuit microelectronic fabrication product; and
- L is the number of levels in the semiconductor integrated circuit microelectronic fabrication product.

12. The method of claim 11 wherein m and n bound a range of from about 15 to about 60 days.

13. The method of claim 11 wherein m and n bound a range of days immediately preceding a future date for which the cycle time is approximated.

14. The method of claim 11 wherein there is not independently approximated a tool utilization when approximating the cycle time.

* * * * *